(12) United States Patent
Hong et al.

(10) Patent No.: US 12,507,851 B2
(45) Date of Patent: Dec. 30, 2025

(54) ROBOT CLEANER

(71) Applicant: LG ELECTRONICS INC., Seoul (KR)

(72) Inventors: Woo Hong, Seoul (KR); Sangik Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 581 days.

(21) Appl. No.: 17/913,122

(22) PCT Filed: Dec. 7, 2020

(86) PCT No.: PCT/KR2020/017730
§ 371 (c)(1),
(2) Date: Sep. 20, 2022

(87) PCT Pub. No.: WO2021/187723
PCT Pub. Date: Sep. 23, 2021

(65) Prior Publication Data
US 2023/0145580 A1 May 11, 2023

(30) Foreign Application Priority Data
Mar. 20, 2020 (KR) .................. 10-2020-0034579

(51) Int. Cl.
*A47L 9/28* (2006.01)
*A47L 9/00* (2006.01)
(Continued)

(52) U.S. Cl.
CPC ............ *A47L 9/2826* (2013.01); *A47L 9/009* (2013.01); *A47L 9/2852* (2013.01); *A47L 11/28* (2013.01);
(Continued)

(58) Field of Classification Search
CPC ... B25J 19/02; A47L 11/4011; A47L 11/4061; A47L 9/2852; A47L 9/009; A47L 9/2826
See application file for complete search history.

(56) References Cited

U.S. PATENT DOCUMENTS

| 7,765,635 | B2 * | 8/2010 | Park ...................... A47L 9/009 15/319 |
| 8,417,383 | B2 * | 4/2013 | Ozick .................. A47L 9/2826 700/258 |

(Continued)

FOREIGN PATENT DOCUMENTS

| EP | 1 963 940 B1 | 9/2009 |
| EP | 3 459 420 A1 | 3/2019 |

(Continued)

*Primary Examiner* — Paul N Dickson
*Assistant Examiner* — Maxwell L Meshaka
(74) *Attorney, Agent, or Firm* — Birch, Stewart, Kolasch & Birch, LLP

(57) ABSTRACT

A robot cleaner having a shielding module provided under a cleaner body is provided. The shielding module includes a cam and a hiding plate which rotate with the same phase angle about a same rotating shaft. The distance between the center of the hiding plate and the center of the rotating shaft is longer than the distance between a contact point on a cam surface of the cam and the center of the rotating shaft. A guide protrusion of a bumper is in contact with the cam surface at the contact point. Therefore, the rotation movement speed of the hiding plate which rotates to hide a cliff sensor is much faster than the inner movement speed of the bumper, thereby improving sensitivity to the detection of a collision between the bumper and an obstacle by using the cliff sensor.

18 Claims, 11 Drawing Sheets

(51) Int. Cl.
*A47L 11/28* (2006.01)
*A47L 11/40* (2006.01)
*G05D 1/00* (2006.01)

(52) U.S. Cl.
CPC ....... *A47L 11/4011* (2013.01); *A47L 11/4061* (2013.01); *G05D 1/0238* (2013.01); *A47L 2201/04* (2013.01)

(56) References Cited

U.S. PATENT DOCUMENTS

| | | | | |
|---|---|---|---|---|
| 9,144,355 | B2 * | 9/2015 | Jang | A47L 9/009 |
| 9,317,038 | B2 * | 4/2016 | Ozick | A47L 9/2826 |
| 11,219,346 | B2 * | 1/2022 | Kang | A47L 5/225 |
| 11,350,809 | B2 * | 6/2022 | Hong | G05D 1/249 |
| 11,465,293 | B2 * | 10/2022 | Brouwers | A47L 11/4011 |
| 11,589,721 | B2 * | 2/2023 | Park | A46B 13/001 |
| 11,638,506 | B2 * | 5/2023 | Hong | A47L 9/0455 15/319 |
| 12,207,784 | B2 * | 1/2025 | Hong | A47L 9/066 |
| 2007/0017061 | A1 | 1/2007 | Yan | |
| 2008/0052867 | A1 * | 3/2008 | Park | A47L 9/009 901/1 |
| 2008/0065265 | A1 * | 3/2008 | Ozick | G05D 1/0227 901/1 |
| 2008/0276407 | A1 | 11/2008 | Schnittman et al. | |
| 2010/0037418 | A1 | 2/2010 | Hussey et al. | |
| 2012/0180251 | A1 | 7/2012 | Jang et al. | |
| 2013/0310978 | A1 * | 11/2013 | Ozick | G05D 1/0227 700/258 |
| 2018/0263447 | A1 | 9/2018 | Yim et al. | |
| 2020/0039079 | A1 | 2/2020 | Brouwers et al. | |
| 2020/0205629 | A1 * | 7/2020 | Hong | G05D 1/0231 |
| 2021/0113040 | A1 * | 4/2021 | Kang | A47L 5/362 |
| 2021/0127928 | A1 * | 5/2021 | Kang | A47L 9/02 |
| 2021/0161339 | A1 * | 6/2021 | Hong | A47L 9/0477 |
| 2021/0212533 | A1 * | 7/2021 | Kang | A47L 5/24 |
| 2022/0079406 | A1 * | 3/2022 | Zhang | A47L 11/4036 |
| 2022/0257077 | A1 * | 8/2022 | Hong | G05D 1/646 |
| 2022/0265102 | A1 * | 8/2022 | Park | A46B 9/026 |
| 2022/0354325 | A1 * | 11/2022 | Hong | A47L 9/0494 |
| 2023/0112896 | A1 * | 4/2023 | Kim | A47L 11/4083 15/49.1 |
| 2023/0145580 | A1 * | 5/2023 | Hong | A47L 11/4011 15/319 |
| 2023/0146907 | A1 * | 5/2023 | Hong | A47L 9/0405 15/319 |
| 2023/0180981 | A1 * | 6/2023 | Hong | A47L 9/2852 15/319 |
| 2023/0301476 | A1 * | 9/2023 | Song | B60B 33/02 |
| 2023/0320547 | A1 * | 10/2023 | Lee | B60K 7/0007 180/65.51 |
| 2024/0008700 | A1 * | 1/2024 | Song | A47L 9/242 |
| 2024/0065499 | A1 * | 2/2024 | Jang | A47L 5/24 |
| 2024/0090736 | A1 * | 3/2024 | Schoenhoff | A47L 9/2857 |
| 2024/0277197 | A1 * | 8/2024 | Jang | A47L 9/1683 |
| 2024/0358213 | A1 * | 10/2024 | Hong | G05D 1/0231 |

FOREIGN PATENT DOCUMENTS

| | | | |
|---|---|---|---|
| KR | 10-2009-0070205 A | 7/2009 | |
| KR | 20-2010-0012420 U | 12/2010 | |
| KR | 20-2011-0006700 U | 7/2011 | |
| KR | 10-2012-0087727 A | 8/2012 | |
| KR | 10-2018-0089932 A | 8/2018 | |
| KR | 10-2018-0106225 A | 10/2018 | |
| KR | 102369253 B1 * | 3/2022 | |
| WO | WO-2007065033 A2 * | 6/2007 | A47L 11/00 |
| WO | WO 2017/003232 A1 | 1/2017 | |
| WO | WO 2018/169180 A1 | 9/2018 | |

\* cited by examiner

ROBOT CLEANER

This application is the National Phase of PCT International Application No. PCT/KR2020/017730, filed on Dec. 7, 2020, which claims priority under 35 U.S.C. § 119 (a) to Patent Application No. 10-2020-0034579, filed in the Republic of Korea on Mar. 20, 2020, all of which are hereby expressly incorporated by reference into the present application.

TECHNICAL FIELD

The present disclosure relates to a robot cleaner that detects a collision of a bumper using a cliff sensor.

BACKGROUND ART

In general, robots have been developed for industrial use and have been part of factory automation. In recent years, the field of application of robots has been further expanded, and not only aerospace robots and medical robots, but also household robots that can be used in general households are being made.

A typical example of a household robot is a robot cleaner. A robot cleaner performs a vacuum cleaning function that sucks dust and foreign matter from a floor while performing autonomous driving in a predetermined region or a mop cleaning function through mopping. Such a robot cleaner is generally provided with a rechargeable battery, and an obstacle detection sensor that can avoid an obstacle while driving to clean while performing autonomous driving.

In some cases, the robot cleaner is unable to avoid an obstacle while driving to collide with the obstacle. In order to detect a collision with an obstacle, a cleaner body is provided with a collision detection portion including a bumper configured to be movable inwardly when in contact with the obstacle, and a detection element that detects the inward movement of the bumper.

US 2007/0017061 A1 (published on Jan. 25, 2007; hereinafter, Patent Document 1) discloses a steering control sensor for a robot cleaner that is driven to change steering when reaching an end of a floor surface or encountering an obstacle while driving.

The steering control sensor is mounted on a front bottom surface of the robot cleaner. The steering control sensor includes a contact member accommodated in a casing and elastically supported by a spring to be movable, and a photo sensor selectively exposed according to the movement of the contact member.

The contact member is movable between an open position and a closed position. When the contact member moves to the open position, the photo sensor may detect light reflected from the bottom surface through a through hole.

When the robot cleaner encounters an obstacle in front to move the contact member to the closed position by an external pressure, the contact member may block the light reflected from the floor surface and the photo sensor may not receive a signal of the reflected light, thereby allowing the robot cleaner to recognize a collision with the obstacle.

In Patent Document 1, a contact member is integrated with a bumper, and a sensor may recognize a bumping operation when the bumper is sufficiently retracted by an effective distance.

However, when the bumper is not retracted by the effective distance, there is a problem in that the sensor does not recognize the bumping operation.

In addition, WO 2018/169180 A1 (published on Sep. 20, 2018; hereinafter, Patent Document 2) discloses a robot cleaner.

The robot cleaner of Patent Document 2 includes a bumper configured to be movable inwardly by an external force, and a cliff sensor that detects a terrain below. The cliff sensor includes a light emitting portion and a light receiving portion, and the controller is configured to measure a time at which light irradiated downward from the light emitting portion is received by the light receiving portion to detect the terrain below.

In Patent Document 2, the bumper may be disposed to cover the cliff sensor in a state in which the bumper is moved inward by an external force, thereby allowing the cliff sensor to recognize a bumping operation of the bumper.

However, there is a problem in that the sensor is unable to recognize the bumping operation when the bumper is not sufficiently retracted by an effective distance.

Therefore, in both Patent Documents 1 and 2, there is a need to improve the sensitivity of the sensor in recognizing the bumping operation.

DISCLOSURE OF INVENTION

Technical Problem

The present disclosure is contrived to solve the problems of the related art, and a first aspect of the present disclosure is to provide a robot cleaner capable of providing a new collision detection structure, unlike a structure in which an inward movement of a bumper covers a cliff sensor as a collision detection element of the bumper.

Furthermore, a second aspect of the present disclosure is to provide a robot cleaner capable of improving the sensitivity of the bumper to collision detection.

In addition, a third aspect of the present disclosure is to provide a robot cleaner capable of improving the reliability of bumper to collision detection.

Solution to Problem

In order to achieve the foregoing objectives of the present disclosure, a robot cleaner according to the present disclosure may include a cleaner body provided with a controller, and a driving wheel the driving of which is controlled by the controller; a bumper mounted on a front surface portion of the cleaner body to be movable toward an inside of the cleaner body by an external force; a cliff sensor mounted on an inside of an opening portion that is open downward at a bottom portion of the cleaner body to detect a terrain below; and a shielding module disposed at the bottom portion of the cleaner body to detect a collision between the bumper and an obstacle, wherein the shielding module includes a cam coming in contact with a guide protrusion protruding inwardly from the bumper so as to be interlocked with the bumper, and rotatably mounted to the bottom portion of the cleaner body about a rotation shaft; and a cover plate rotatably mounted about the rotation shaft while maintaining a phase angle with the cam to selectively expose the cliff sensor.

According to an example associated with the present disclosure, the cover plate may reciprocally rotate between a first position disposed to expose the cliff sensor before a collision between the bumper and an obstacle and a second position disposed to cover the cliff sensor by an inward movement of the bumper after the collision, wherein the shielding module further includes an elastic element that restores the cover plate from the second position to the first position.

According to an example associated with the present disclosure, the elastic element may be disposed between the bumper and the opening portion to elastically push the cover plate such that the cover plate does not overlap the opening portion in a top-down direction.

According to an example associated with the present disclosure, the shielding module may further include an elastic element that restores the cover plate, which rotates according to the inward movement of the bumper, to an original position, wherein the elastic element is implemented as a spring.

According to an example associated with the present disclosure, the shielding module may further include an elastic element that restores the cover plate, which rotates according to the inward movement of the bumper, to an original position; and a mounting guide provided at a bottom portion of the cleaner body to guide the mounting of the shielding module, wherein one side of the elastic element is supported by a first fixing protrusion disposed on the mounting guide, and the other side of the elastic element is supported by a second fixing protrusion disposed on the cover plate.

According to an example associated with the present disclosure, the shielding module may further include a hinge portion hinge-coupled to the rotation shaft, and connected to the cam and the cover plate to support the cam and the cover plate.

According to an example associated with the present disclosure, the cam may include an inclined surface disposed to be inclined in a direction intersecting a front-rear direction and a left-right lateral direction with respect to a head-on or lateral collision between the bumper and the obstacle to make contact with the guide protrusion.

According to an example associated with the present disclosure, a distance between the center of the cover plate and the center of the rotation shaft may be configured to be greater than a distance between a contact point of the cam in contact with the guide protrusion and the center of the rotation shaft.

According to an example associated with the present disclosure, the shielding module may further include a mounting guide provided on a bottom surface of the cleaner body to guide the mounting of the shielding module.

According to an example associated with the present disclosure, the mounting guide may be provided with a guide hole that limits a movement range of the bumper, wherein the guide protrusion moves in a front-rear direction or a left-right direction while being accommodated in the guide hole according to an inward movement of the bumper.

According to an example associated with the present disclosure, the bumper may further include a protruding portion disposed to protrude from the bumper toward the mounting guide, wherein the mounting guide includes a first accommodating portion that accommodates the cover plate disposed not to overlap the opening portion in a top-down direction; and a second accommodating portion that accommodates the protruding portion to movably support the protruding portion.

According to an example associated with the present disclosure, the mounting guide may be disposed between the bumper and the opening portion, wherein the mounting guide may further include a partition wall extending in a direction intersecting an outside and an inside of the mounting guide to partition the first and second accommodation portions; a first shielding wall extending along an outer edge of the first accommodating portion from one end of the partition wall to open the first accommodating portion in a direction facing the cover plate; and a second shielding wall extending from the other end of the partition wall along an inner edge of the second accommodation portion to open the second accommodation portion in a direction facing the bumper.

According to an example associated with the present disclosure, the cliff sensor may include a light emitting portion that irradiates light to a lower side of the opening portion; and a light receiving unit that receives reflective light.

According to an example associated with the present disclosure, the shielding modules may be disposed symmetrically to each other on both left and right sides of the cleaner body with respect to a front-rear center line passing through the center of the cleaner body in a front-rear direction According to an example associated with the present disclosure, the robot cleaner may further include a support portion that movably supports the bumper in a front-rear direction and a left-right lateral direction with respect to the cleaner body.

According to an example associated with the present disclosure, the bumper may further include an engaging hook disposed to protrude from an upper end of the bumper toward an inside thereof such that an upper end portion of the bumper is supported to be suspended on the support portion, wherein the support portion includes a support body extending along a front edge of the cleaner body to allow the engaging hook to be slidable; an engaging protrusion disposed to protrude from a front end of the support body to allow the engaging hook to be caught; and a plurality of fitting portions to allow the support body to be fit and coupled to the cleaner body.

According to an example associated with the present disclosure, the robot cleaner may include a brush module or a mop module mounted to be accommodated into the cleaner body, wherein the opening portion is disposed at a front side of the brush module or the mop module.

According to an example associated with the present disclosure, the robot cleaner may further include a mounting guide that guides the mounting of the shielding module, wherein the mounting guide is provided with a guide hole that limits a movement range of the guide protrusion, and the guide hole is disposed to be inclined from an outside of the mounting guide to an inside thereof rearward such that the guide protrusion pushes the cam rearward to rotate.

According to an example associated with the present disclosure, the cliff sensor may be disposed at a rear side of the guide hole.

According to an example associated with the present disclosure, the cam may include an inclined surface disposed to be inclined rearward from an inside of the mounting guide to an outside thereof to make contact with the guide protrusion.

Advantageous Effects of Invention

The effects of a robot cleaner according to the present disclosure will be described as follows.

First, a shielding module provided at a lower portion of a cleaner body provided separately from a bumper may selectively expose a cliff sensor in conjunction with an inward movement of the bumper, thereby detecting a collision between the bumper and an obstacle.

Second, the shielding module includes a cam and a cover plate that rotate with the same phase angle around the same rotation shaft. A distance between the center of the cover plate and the center of the rotation shaft is configured to be greater compared to a distance between a contact point of an inclined surface of the cam in contact with a guide protrusion of the bumper and the center of the rotation shaft. For this reason, a rotational movement speed of the cover plate that rotates to cover the cliff sensor is much faster than an inward movement speed of the bumper. Accordingly, a sensitivity between the bumper and the obstacle to collision detection using the cliff sensor is improved.

Third, a guide protrusion protruding from an inner surface of the bumper is provided on the bumper, and a shielding module has a guide hole for limiting a movement range of the guide protrusion. The guide hole is disposed to be inclined such that the guide protrusion is able to move on an inclined surface of the cam to a rear side thereof during a front collision of the bumper as well as a side collision of the bumper. As a result, the cover plate may be guided to cover the cliff sensor in all collision directions of the bumper, thereby enhancing the reliability of collision detection.

MODE FOR THE INVENTION

Figure 1:
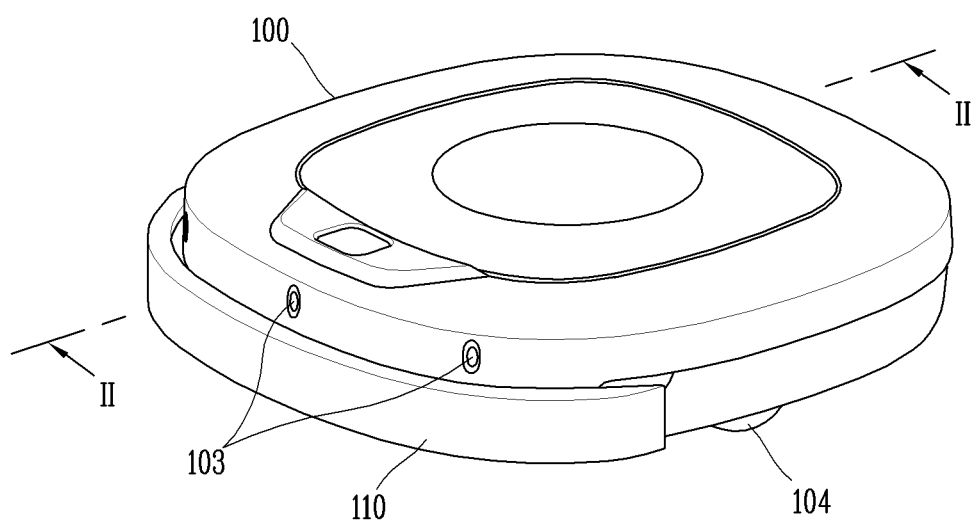
FIG. 1 is a perspective view showing an appearance of a robot cleaner according to the present disclosure.

Hereinafter, the embodiments disclosed herein will be described in detail with reference to the accompanying drawings, and the same or similar elements are designated with the same numeral references regardless of the numerals in the drawings and redundant description thereof will be omitted. A suffix "module" and "unit" used for constituent elements disclosed in the following description is merely intended for easy description of the specification, and the suffix itself does not give any special meaning or function. In describing the embodiments disclosed herein, moreover, the detailed description will be omitted when specific description for publicly known technologies to which the invention pertains is judged to obscure the gist of the present disclosure. Also, it should be understood that the accompanying drawings are merely illustrated to easily explain the concept of the invention, and therefore, they should not be construed to limit the technological concept disclosed herein by the accompanying drawings, and the concept of the present disclosure should be construed as being extended to all modifications, equivalents, and substitutes included in the concept and technological scope of the invention.

It will be understood that, although the terms first, second, etc. may be used herein to describe various elements, these elements should not be limited by these terms. The terms are used merely for the purpose to distinguish an element from the other element.

In case where an element is "connected" or "linked" to the other element, it may be directly connected or linked to the other element, but another element may be existed therebetween. On the contrary, in case where an element is "directly connected" or "directly linked" to the other element, it should be understood that any other element is not existed therebetween.

A singular representation may include a plural representation as far as it represents a definitely different meaning from the context.

Terms "include" or "has" used herein should be understood that they are intended to indicate the existence of a feature, a number, a step, a constituent element, a component or a combination thereof disclosed in the specification, and it may also be understood that the existence or additional possibility of one or more other features, numbers, steps, constituent elements, components or combinations thereof are not excluded in advance.

FIG. 1 is a perspective view showing an appearance of a robot cleaner according to the present disclosure.

Figure 2:
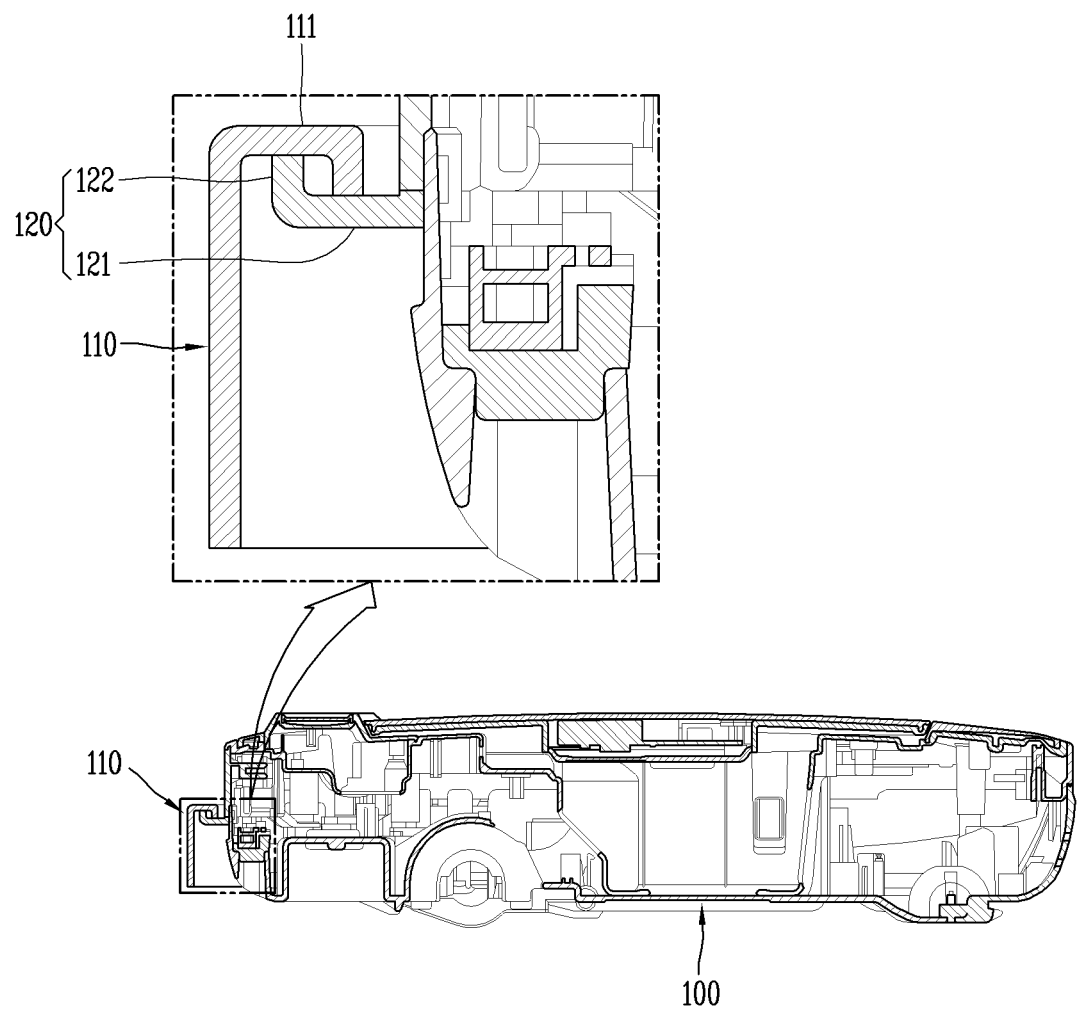
FIG. 2 is a cross-sectional view taken along line II-II in FIG. 1.

FIG. 2 is a cross-sectional view taken along line II-II in FIG. 1.

Figure 3:
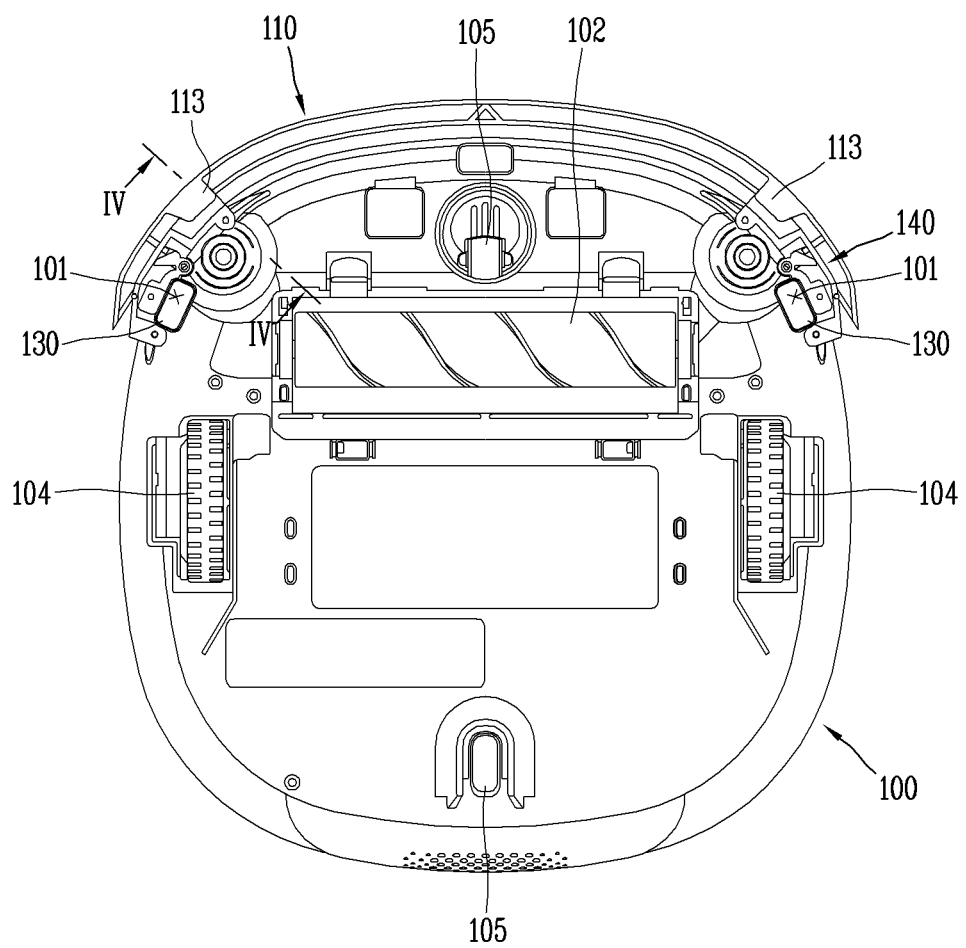
FIG. 3 is a bottom view of FIG. 1.

FIG. 3 is a bottom view of FIG. 1.

Figure 4:
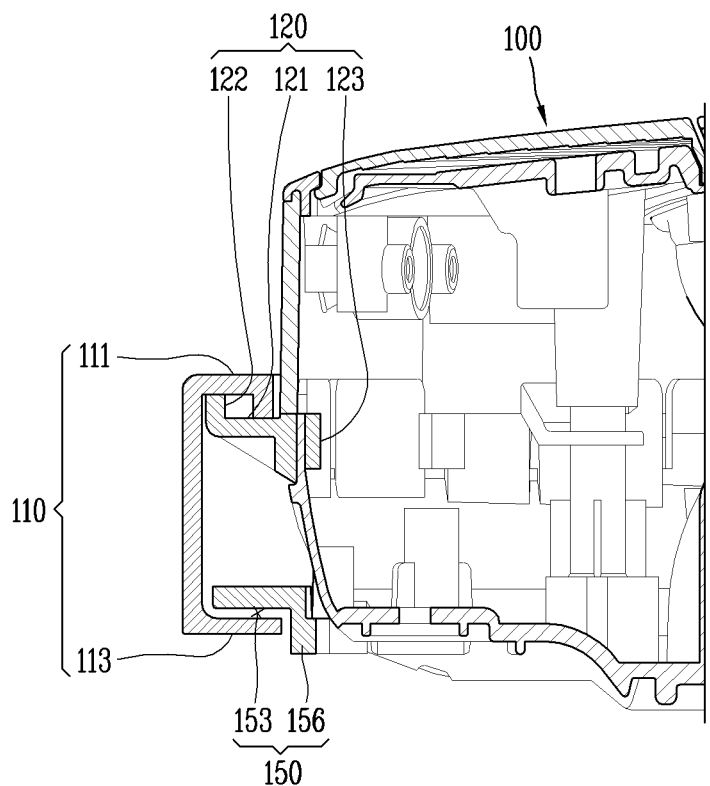
FIG. 4 is a cross-sectional view taken along line IV-IV in FIG. 3.

FIG. 4 is a cross-sectional view taken along line IV-IV in FIG. 3.

The robot cleaner is configured to perform a function of cleaning a floor while performing autonomous driving in a predetermined region. Here, the cleaning of the floor may be understood as a concept including sucking dust and foreign matter on the floor or mopping the floor.

In this example, it is shown that the robot cleaner is configured to perform a vacuum cleaning function of sucking air from the floor and separating dust and foreign matter from the sucked air while performing autonomous driving in a predetermined region.

The robot cleaner is configured to include a cleaner body 100. The cleaner body 100 defines the appearance of the cleaner. Various parts, including a controller for controlling the cleaner, are integrated or mounted in the cleaner body 100.

A circuit board (not shown) constituting the controller may be disposed in the cleaner body 100. Various modules, for example, a brush module 102 or a mop module (not shown) may be detachably coupled to the cleaner body 100.

A driving wheel 104 is provided on a bottom surface of the cleaner body 100. The driving wheel 104 is configured to rotate by receiving a driving force from a drive motor (not shown). The drive motor may receive a control signal from the controller to control its driving.

The driving wheels 104 may be provided on both left and right sides of the bottom surface of the cleaner body 100, respectively. For independent driving of each driving wheel 104, the drive motor may be connected to each driving wheel 104.

The cleaner body 100 may be moved or rotated forward, backward, left, and right by the rotation of the driving wheel 104.

An auxiliary wheel 105 may be additionally provided in the cleaner body 100. The auxiliary wheel 105 may be distinguished from the driving wheel 104 in that it has only a rolling function for the floor.

The auxiliary wheel 105 may support the cleaner body 100 together with the driving wheel 104. The auxiliary wheel 105 is configured to assist the driving of the cleaner body 100.

The plurality of auxiliary wheels 105 may be rotatably provided at the front and rear centers of the cleaner body 100 around a lateral center line passing through the center of the plurality of driving wheels 104.

A battery (not shown) that supplies power to the robot cleaner is mounted on the cleaner body 100. The battery may be configured to be rechargeable, and configured to be detachable from a bottom surface portion of the cleaner body 100.

A sensing unit 103 may be disposed on the cleaner body 100. The sensing unit 103 may be disposed at a front side of the cleaner body 100. The sensing unit 103 may be located at a predetermined height from a front surface of the cleaner body 100.

The sensing unit 103 may be configured to detect an obstacle or a geographic feature in front to disallow the cleaner body 100 to collide with the obstacle using ultrasonic waves.

When the robot cleaner is configured to perform a vacuum cleaning function, air containing dust and foreign matter may be sucked through an opening disposed at a bottom portion of the cleaner body 100.

A brush module 102 that sweeps up dust and foreign matter on the floor may be mounted in the opening.

When the brush module 102 is separated from the cleaner body 100, the mop module may be detachably coupled to a bottom surface of the cleaner body 100 to replace the separated brush module 102.

A user may selectively mount the brush module 102 or the mop module on the cleaner body 100 according to the purpose of cleaning.

The controller may recognize a module mounted on the cleaner body 100 to perform an operation corresponding thereto.

For example, when the brush module 102 is mounted on the cleaner body 100, the controller may drive a motor and a fan to generate a suction force for sucking air from the floor. Furthermore, a rotation drive unit (not shown) may be driven to allow the brush module 102 connected to the rotation driving unit to sweep up dust and foreign matter on the floor.

When the mop module is mounted on the cleaner body 100, the controller may drive the rotation drive unit. The mop module connected to the rotation drive unit is rotated by the driving of the rotation drive unit to wipe the floor. The controller controls not to drive the motor and the fan while the mop module is mounted on the cleaner body 100.

Dust and foreign matter in the air sucked in through the brush module 102 are filtered and collected in a dust container (not shown), and the air from which the dust and foreign matter are separated is discharged to an outside of the cleaner body 100.

A suction passage (not shown) that guides air flowing in through the opening to the dust container and an exhaust passage (not shown) that guides the flow of air from the dust container to an outside of the cleaner body 100 are disposed inside the cleaner body 100.

The dust container may be detachably accommodated inside the cleaner body 100.

The dust container may include at least one of a filter and a cyclone for filtering dust and foreign matter in the sucked air.

When the cleaner body 100 collides with an obstacle while driving, the collision may mainly occur at a front surface portion or both end portions of the left and right sides of the cleaner body 100.

At a front side of the cleaner body 100, a bumper 110 may be mounted on a front surface of the cleaner body 100 in order to mitigate an impact when colliding with an obstacle.

The bumper 110 may extend long along the left and right circumferences of the cleaner body 100 to cover the front surface and both end portions of the left and right sides of the cleaner body 100.

The bumper 110 may extend in a top-down direction of the cleaner body 100. The bumper 110 has a predetermined height.

A lower end of the bumper 110 may be located higher than a bottom surface of the cleaner body 100.

An upper end of the bumper 110 may be located lower than the sensing unit 103.

The bumper 110 may be formed of an elastic material to absorb shock when the cleaner body 100 collides with an obstacle.

The bumper 110 is configured to be movably supported in an inward direction of the cleaner body 100 by a support portion 120 when colliding with an obstacle.

The support portion 120 may support the bumper 110 such that the bumper 110 is movable in a front-rear direction of the cleaner body 100 with respect to the cleaner body 100.

The bumper 110 may be mounted to be suspended while an upper end portion thereof is mounted on the support portion 120.

To this end, an engaging hook 111 at an upper end of the bumper 110 may be disposed to protrude above the support portion 120. A rear end portion of the engaging hook 111 may be defined in a downwardly bent shape to be caught by the support portion 120.

According to this configuration, the engaging hook 111 may be prevented from being released from the support portion 120.

The support portion 120 may be disposed between the bumper 110 and a front surface portion of the cleaner body 100. The support portion 120 may be defined in a curved shape along the front surface portion and the left and right sides of the cleaner body 100.

The support portion 120 may be configured to include a support body 121, an engaging protrusion 122, and a fitting portion 123.

A rear end portion of the support body 121 is supported on a front surface portion of the cleaner body 100, and the support body 121 may horizontally extend forward in a cantilever shape.

The engaging protrusion 122 is disposed to protrude upward from a front end of the support body 121 such that the engaging hook 111 is caught. The engaging protrusion 122 may extend long along left and right circumferences of the support portion 120.

A protruding length of the engaging hook 111 may be disposed to correspond to that of the support body 121.

At least part of the engaging hook 111 is disposed to overlap the support body 121 in a top-down direction.

According to this configuration, since an end portion of the engaging hook 111 is movable in a front-rear direction on an upper surface of the support body 121, an upper end portion of the bumper 110 may be supported by the support portion 120 to be movable forward, backward, left, and right while being suspended on the support portion 120.

The fitting portion 123 may be provided at a rear end portion of the support body 121. A plurality of fitting portions 123 may be disposed to be spaced apart from one another along a circumference of the support body 121.

The fitting portion 123 may be provided with fitting grooves on both left and right side surfaces with an intermediate partition wall interposed therebetween. The fitting portion 123 may be formed in an H-shape or I-shape. A plurality of slits may be disposed on a front surface of the cleaner body 100.

The intermediate partition wall of the fitting portion 123 is fitted along the slit, and both left and right end portions of the slit of the cleaner body 100 are fitted into the fitting grooves on both sides thereof, thereby allowing the support portion 120 to be coupled to the cleaner body 100.

A plurality of protruding portions 113 may be disposed at a lower end of the bumper 110 such that a lower end portion of the bumper 110 is not inclined toward an inside of the cleaner body 100 than an upper end portion of the bumper 110, and a front surface of the bumper 110 maintains a top-down direction while the upper end portion of the bumper 110 is suspended on the support portion 120.

The protruding portion 113 may be disposed to protrude horizontally toward an inside of the cleaner body 100.

The plurality of protruding portions 113 may be spaced apart from one another on both left and right sides along a circumference of the bumper 110. The plurality of protruding portions 113 may be symmetrically spaced apart from each other on both left and right sides with respect to a front-rear center line passing through a longitudinal center of the bumper 110 in a front-rear direction. The plurality of protruding portions 113 may be symmetrically disposed with respect to the front-rear center line.

The protruding portion 113 may extend along a partial section of the left and right circumferences of the bumper 110. One side surface of the protruding portion 113 may protrude in a curvature radial direction perpendicular to a curved surface of the bumper 110, and the other side surface of the protruding portion 113 may be disposed to protrude obliquely with respect to the curved surface of the bumper 110.

An outer circumferential length of the protruding portion 113 may extend longer than an inner circumferential length of the protruding portion 113. The protruding portion 113 may have a trapezoidal plate structure.

The protruding portion 113 may be accommodated on one side of the mounting guide 150 to be described later and movably supported an inside of the cleaner body 100 by the mounting guide 150.

According to this configuration, the protruding portion 113 is accommodated in a second accommodating portion 153 disposed on one side of the mounting guide 150 to stably guide the movement of the bumper 110.

Although the sensing unit 103 detects an obstacle in front of the cleaner body 100, when there is an obstacle in a blind spot that cannot be sensed by the sensing unit 103 or an obstacle suddenly appears, a collision between the robot cleaner and the obstacle may occur.

When such a collision occurs, the cleaner body 100 needs to be controlled so as to be separated from the obstacle through a retreat or change of direction. For this, the detection of a collision with an obstacle is required preferentially.

Hereinafter, a collision detection portion for detecting a collision with an obstacle will be described in more detail.

Figure 5:
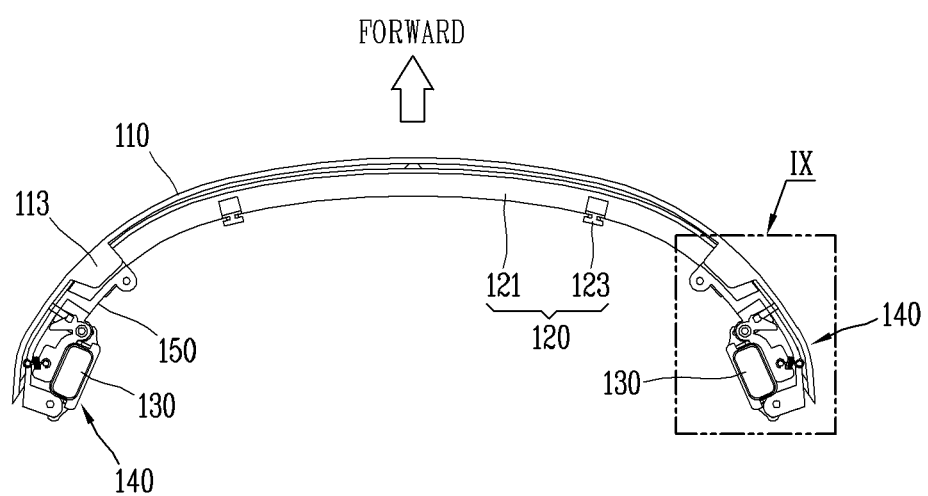
FIG. 5 is an assembly view showing a shape in which a collision detection portion mounted on a front surface of a cleaner body in FIG. 3 is viewed from a bottom surface.

FIG. 5 is an assembly view showing a shape in which a collision detection portion mounted on a front surface of the cleaner body 100 in FIG. 3 is viewed from a bottom surface.

Figure 6:
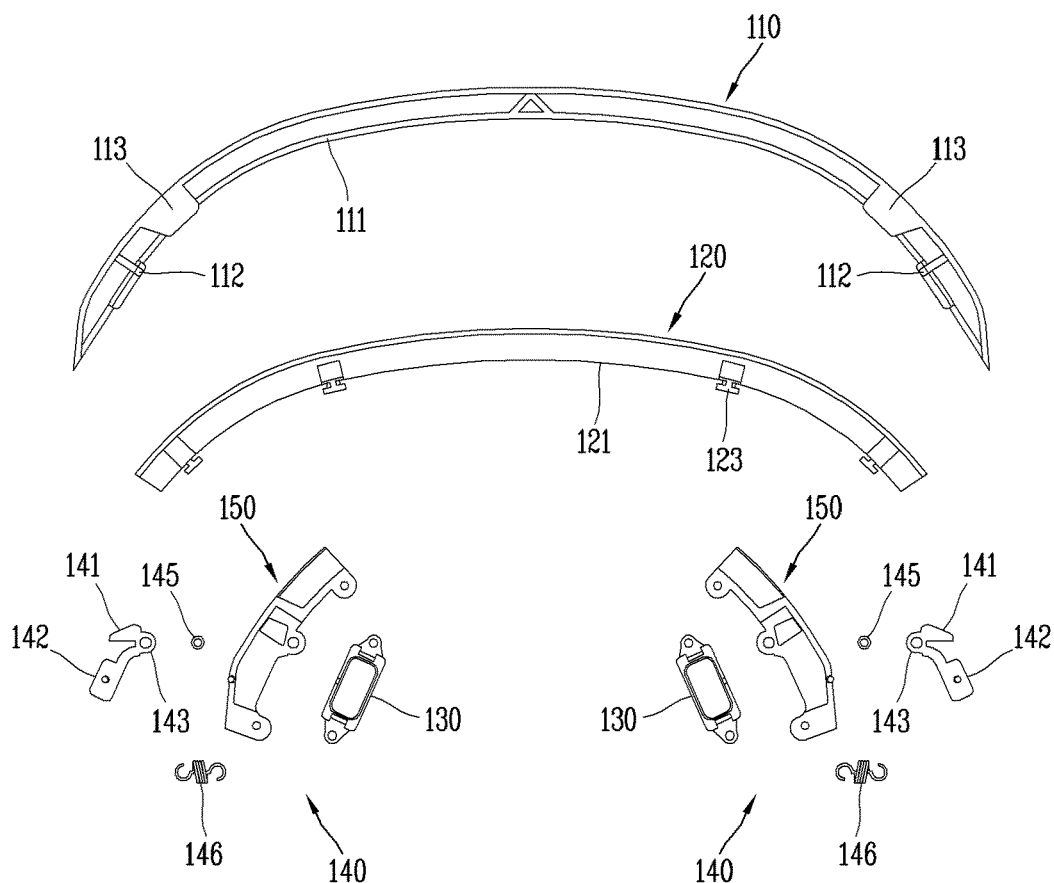
FIG. 6 is an exploded view of a bumper, a support portion, a cliff sensor, and a shielding module (a mounting guide, a cover plate, a cam) in FIG. 5.

FIG. 6 is an exploded view of the bumper 110, the support portion 120, the cliff sensor 130, and the shielding module 140 (the mounting guide 150, the cover plate 142, the cam 141) in FIG. 5.

Figure 7:
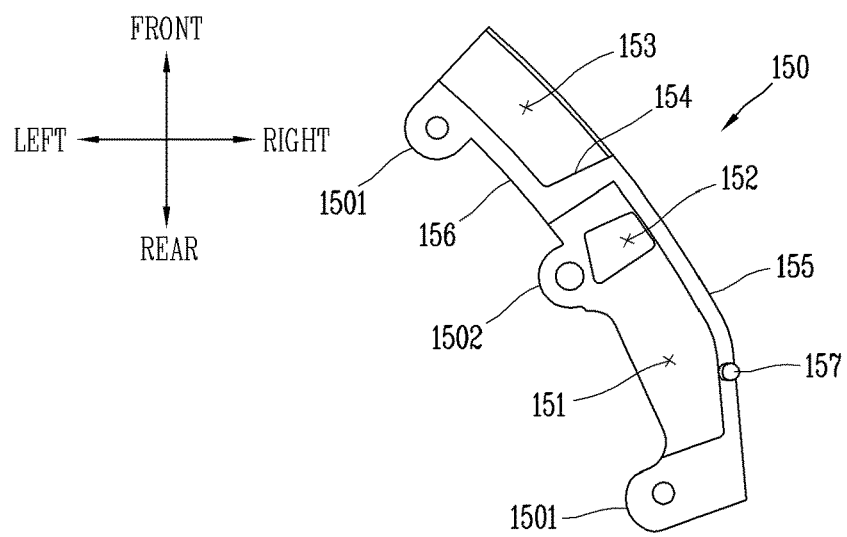
FIG. 7 is a bottom view showing the mounting guide in FIG. 6.

FIG. 7 is a bottom view showing the mounting guide 150 in FIG. 6.

Figure 8:
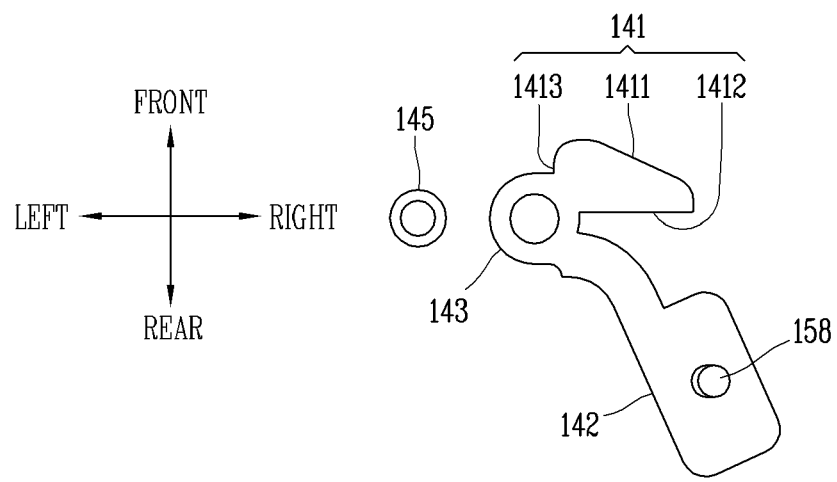
FIG. 8 is a bottom view showing the cover plate, the cam, and the rotation shaft in FIG. 6.

FIG. 8 is a bottom view showing the cover plate 142, the cam 141, and the rotation shaft 145 in FIG. 6.

Figure 9:
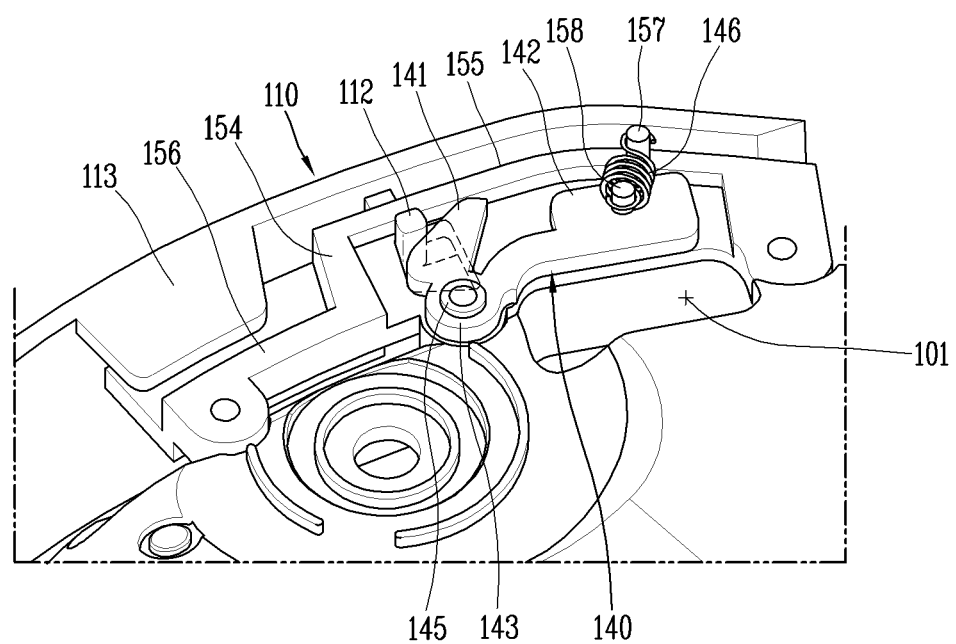
FIG. 9 is an enlarged conceptual view showing a shape in which the shielding module is mounted on a bottom surface of the cleaner body by enlarging dashed box IX in FIG. 5.

FIG. 9 is an enlarged conceptual view showing a shape in which the shielding module 140 is mounted on a bottom surface of the cleaner body 100 by enlarging dashed box IX in FIG. 5.

An opening portion 101 is disposed on a bottom surface of the cleaner body 100 to open downward. The opening portion 101 may be disposed on left and right sides of the bottom surface of the cleaner body 100 with the brush module 102 or the mop module therebetween.

The cliff sensor 130 that detects a terrain below may be disposed inside the opening portion 101. The cliff sensor 130 may be disposed above the opening portion 101. The cliff sensor 130 may be mounted inside the cleaner body 100.

The cliff sensor 130 may be exposed to a lower side of the cleaner body 100 through the opening portion 101.

The cliff sensor 130 may include a sensor housing, a housing cover, a light emitting portion 131, and a light receiving portion 132.

Fastening portions may be disposed to protrude from both end portions of the sensor housing. The fastening portion may be defined in a ring shape having a fastening hole disposed therein. The fastening portion may fasten both sides of the sensor housing to the cleaner body 100 using a fastening member such as a screw passing through the fastening hole.

The housing cover is mounted to cover an open lower portion of the sensor housing.

The light emitting portion 131 is configured to irradiate light (e.g., infrared rays) to a lower side of the opening portion 101.

The light receiving portion 132 is configured to receive reflective light reflected from the floor.

According to this configuration, light is irradiated downward from the light emitting portion 131 through the opening portion 101, and reflective light is reflected from the floor and received by the light receiving portion 132.

The controller may measure a time period taken from a time point at which light is irradiated from the light emitting portion 131 to the completion of reception by the light receiving portion 132 to measure a distance between the cliff sensor 130 and the floor.

Accordingly, in a case where there is a step protrusion that is sharply lowered in front of the cleaner body 100, when the reception time period of the reflective light is rapidly increased, and there is a cliff in front, the reflected light is not received by the light receiving portion 132.

The cliff sensor 130 may be disposed to be inclined with respect to a bottom surface of the cleaner body 100 such that the light emitting portion 131s irradiate light toward the floor at a lower front side thereof.

According to this configuration, the cliff sensor 130 may detect a terrain at a lower front side of the cleaner body 100, and accordingly, there is an advantage capable of performing an evasive operation by detecting a geographic feature on an expected path of the cleaner body 100 in advance.

Unlike an inclined disposition structure of the cliff sensor 130, the cliff sensor 130 may also be configured to be vertically disposed on a bottom surface of the cleaner body 100 such that the light emitting portion 131 irradiates light to be perpendicular to the floor on which the cleaner body 100 is supported.

When it is detected that the terrain below is lowered to a predetermined level or more through the cliff sensor 130, the controller may change the control of the driving wheel 104 in a preset manner.

For example, the controller may control the drive motor to rotate the robot cleaner so as to drive only one driving wheel 104 or drive both driving wheels 104 in different directions.

Alternatively, the controller may drive the driving wheel 104 in an opposite direction such that the robot cleaner moves backward in a reverse direction.

Meanwhile, the cleaner body 100 is provided with a collision detection portion that detects a physical collision with an obstacle. The collision detection portion includes the bumper 110 and the cliff sensor 130 described above.

The bumper 110 is movably mounted to the support portion 120, and the bumper 110 is disposed to protrude forward from a front surface of the cleaner body 100 in a state where no external force is applied.

When the bumper 110 collides with an obstacle, a portion of the bumper 110 is configured to be movable toward an inside of the cleaner body 100 by being pushed by an external force.

When the bumper 110 is spaced apart from the obstacle, the bumper 110 is moved to an outside of the cleaner body 100, that is, to a front side of the cleaner body 100, and returned to an original position, for example, a position at which the bumper 110 protrudes forward from a front surface of the cleaner body 100.

For the inward and outward movements of the bumper 110, an elastic member (not shown) may be disposed between the bumper 110 and the cleaner body 100. The elastic member may be configured to elastically push the bumper 110 to an outside of the cleaner body 100.

Alternatively, the bumper 110 may be elastically supported by the cleaner body 100 to be movable inwardly.

To this end, the bumper 110 may be provided with the elastic support portion 120 elastically supported by the cleaner body 100. In this case, there is an advantage of reducing production cost and simplifying structure in that an elastic member is not required.

In a robot cleaner in the related art, a detection element that detects an inward movement of the bumper 110, for example, a micro switch, an infrared sensor, and the like are provided inside the bumper 110. However, in this case, there are problems such as an increase in production cost due to the detection element and an increase in the volume of the cleaner body 100 due to the mounting of the detection element.

The present disclosure provides the cliff sensor 130 and the shielding module 140 as described above as an element that detects an inward movement of the bumper 110 when colliding with an obstacle.

Hereinafter, this will be described in detail.

A plurality of shielding modules 140 may be disposed symmetrically to each other on both left and right sides with respect to a front-rear center line passing through the center of the cleaner body 100 in a front-rear direction. The plurality of shielding modules 140 may be disposed adjacent to both left and right end portions of the bumper 110, respectively.

The shielding module 140 is configured to selectively expose the cliff sensor 130 in conjunction with the bumper 110.

The shielding module 140 may include a mounting guide 150, a cam 141, a cover plate 142, a rotation shaft 145, and an elastic element 146.

The mounting guide 150 may be defined in the form of an arc-shaped plate.

The mounting guide 150 is mounted on a bottom surface of the cleaner body 100. Coupling portions 1501 may be disposed to protrude from front and rear end portions of the mounting guide 150 in a circumferential direction thereof. A coupling hole may be formed inside the coupling portion 1501. The coupling portion 1501 may couple the mounting guide 150 and the cleaner body 100 by allowing a fastening portion such as a screw to pass through the coupling hole.

The mounting guide 150 may be disposed between the bumper 110 and the opening portion 101.

An outer peripheral edge portion of the mounting guide 150 may be disposed adjacent to the bumper 110, and an inner peripheral edge portion of the mounting guide 150 may be disposed adjacent to the opening portion 101.

A first accommodating portion 151 may be concavely disposed on one side of the mounting guide 150, and a second accommodating portion 153 may be concavely disposed on the other side of the mounting guide 150. The first accommodating portion 151 and the second accommodating portion 153 may be partitioned by a partition wall 154.

The first accommodating portion 151 is configured to accommodate the cam 141 and the cover plate 142. The cam 141 is configured to be in contact with the bumper 110. The cover plate 142 is configured to selectively expose the cliff sensor 130.

The cam 141 and the cover plate 142 are configured to rotate together around the same rotation shaft 145. The cam 141 and the cover plate 142 may be connected to each other by a hinge portion 143 surrounding the rotation shaft 145.

The hinge portion 143 may be defined in a ring shape. A hinge hole may be disposed inside the hinge portion 143. The hinge portion 143 may be hinge-coupled to the rotation shaft 145 by allowing the rotation shaft 145 to pass through the hinge hole.

The cam 141 and the cover plate 142 may extend in a rotational radial direction with a preset phase angle therebetween. Here, the phase angle may be an acute angle smaller than 90 degrees.

One side of the cam 141 may be supported by being connected to one side of the hinge portion 143.

One side of the cover plate 142 may be supported by being connected to the other side of the hinge portion 143. One side of the hinge portion 143 may be located in front of the other side of the hinge portion 143 toward the bumper 110. A connection portion may extend between the cover plate 142 and the hinge portion 143, and the cover plate 142 and the hinge portion 143 may be connected by the connection portion. The connection portion may extend in a curved shape to surround one edge of the opening portion 101.

The cam 141 may be formed in a right-angled triangle shape. Among the corners of the cam 141, a corner portion meeting at a right angle may be connected to the hinge portion 143.

An edge surface of the cam 141 may be composed of three surfaces, that is, an inclined surface 1411, a bottom surface 1412, and a height surface 1413.

The inclined surface 1411 is inclined with respect to the bottom surface 1412 and the height surface 1413.

The inclined surface 1411 is configured to be in contact with the guide protrusion 112 disposed to protrude from the bumper 110. The guide protrusion 112 may be integrally connected to the bumper 110 by a connecting rib.

The connecting rib may include a first connecting rib and a second connecting rib.

The first connection rib may extend from an inner surface of the bumper 110 toward an inner side of the cleaner body 100 in a curvature radial direction of the bumper 110.

The second connecting rib may be disposed to extend in a circumferential direction from an inner end of the first connecting rib.

The guide protrusion 112 is disposed to protrude downward from the second connecting rib. The guide protrusion 112 may be defined in various shapes, such as a rectangular, a circular cross-sectional shape, and the like.

Three surfaces of the cam 141 may extend in the following directions from an initial position prior to the occurrence of a bumping operation of the bumper 110 (with reference to FIG. 8).

The bottom surface 1412 may extend in a left-right lateral direction of the cleaner body 100.

The height surface 1413 may extend in a front-rear direction of the cleaner body 100.

The inclined surface 1411 may extend to be inclined in a direction intersecting the bottom surface 1412 and the height surface 1413.

A length of the bottom surface 1412 may be longer than that of the height surface 1413.

The inclined surface 1411 is brought into contact with the guide protrusion 112 of the bumper 110 in conjunction with the movement of the bumper 110.

The inclined surface 1411 extends in a direction intersecting a movement direction of the guide protrusion 112.

Both side corners of the inclined surface 1411 meeting the bottom surface 1412 and the height surface 1413 may be disposed to be rounded in a curved shape.

According to this configuration, when the bumper 110 collides with an obstacle, the cam 141 may be rotated about the rotation shaft 145 no matter which direction the guide protrusion 112 is pushed against the inclined surface 1411.

Furthermore, the inclined surface 1411 of the cam 141 may serve to convert a linear movement of the guide protrusion 112 into a rotational movement of the cam 141.

The cover plate 142 may be defined in a rectangular plate shape. The cover plate 142 may be disposed to be smaller than an opening area of the opening portion 101. Each corner portion of the cover plate 142 may be disposed to be rounded in a curved shape.

The cover plate 142 may be connected to the hinge portion 143 by a connecting portion. One side of the connecting portion may be connected to one corner portion of the cover plate 142, and the other side of the connecting portion may extend to be connected to the other side of the hinge portion 143.

According to this configuration, the cover plate 142 may selectively expose the cliff sensor 130 before and after a collision between the bumper 110 and the obstacle.

For example, the cover plate 142 is disposed to reciprocally rotate between a first position and a second position about the rotation shaft 145.

The first position is a position of the cover plate 142 before the bumper 110 collides with the obstacle. At the first position, the cover plate 142 is disposed not to overlap the opening portion 101 in a top-down direction. One side surface of the cover plate 142 may be disposed on a boundary line of one side of the opening portion 101.

At the first position, the cover plate 142 may expose the cliff sensor 130. Since the cliff sensor 130 irradiates light downward through the opening portion 101, and then receives reflective light reflected from the floor after, it is unable to recognize an inward movement (bumping operation) of the bumper 110.

The second position is a position of the cover plate 142 after the bumper 110 collides with the obstacle.

At the second position, the cover plate 142 is disposed to overlap the opening portion 101 in a top-down direction.

At the second position, the cover plate 142 may cover the cliff sensor 130. Since the cliff sensor 130 irradiates light downward through the opening portion 101, and then receives reflective light reflected by the cover plate 142 before the light reaches the floor, it is able to recognized an inward movement (bumping operation) of the bumper 110.

Here, since the reception time period of reflective light reflected by the cover plate 142 is rapidly shortened compared to the reception time period of light reflected by the floor, the controller recognizes the bumping operation.

The reception time period of the reflective light by the cover plate 142 may be shorter than the reception time period of the reflected light by a step protrusion. A height between the cover plate 142 and the floor surface is located higher than that of an upper end of the step protrusion capable of passing through a lower portion of the bumper 110.

A distance between the center of the rotation shaft 145 and an outermost portion of the cover plate 142 farthest therefrom is greater than a distance between a contact point of the inclined surface 1411 of the cam 141 in contact with the guide protrusion 112 and the center of the rotation shaft 145. For example, the distance between the center of the rotation shaft 145 and the outermost portion of the cover plate 142 farthest therefrom may be 2 to 3 times greater compared to the distance between the contact point of the inclined surface 1411 of the cam 141 with which the guide protrusion 112 is in contact and the center of the rotation shaft 145.

According to this configuration, a rotational movement distance of the cover plate 142 for the same time period during an inward movement of the bumper 110 may be greater than a movement distance of the guide protrusion 112 such that a movement speed of the cover plate 142 is much faster than that of the bumper 110, thereby increasing a recognition speed of the inward movement of the bumper 110.

Furthermore, during the inward movement of the bumper 110, an amount of rotation of the cover plate 142 for the same time period may be much greater than an amount of rotation of the cam 141 by pushing the guide protrusion 112, thereby improving the sensitivity of the bumper 110 to inward movement recognition.

The second accommodating portion 153 is configured to accommodate the protruding portion 113 protruding from a lower side of the bumper 110.

The second accommodating portion 153 may be defined in a flat plate shape. The protruding portion 113 may also be defined in a flat plate shape. The protruding portion 113 may be in surface contact with the second accommodating portion 153. The protruding portion 113 is configured to be slidable along the second accommodating portion 153 during the inward movement of the bumper 110.

The protruding portion 113 may be configured to be inserted into the second accommodating portion 153, thereby allowing the mounting guide 150 to guide the mounting of the bumper 110 so as to improve assembly performance.

The second accommodating portion 153 may be disposed at a front side of the first accommodating portion 151 in a circumferential direction.

The partition wall 154 may be disposed between the first accommodating portion 151 and the second accommodating portion 153. The partition wall 154 may extend in a direction crossing an outer edge portion and an inner edge portion of the mounting guide 150.

The first accommodating portion 151 and the second accommodating portion 153 may be disposed to be open in opposite directions to each other.

As the protruding portion 113 of the bumper 110 is accommodated from an outside of the second accommodating portion 153 to an inside thereof, the second accommodating portion 153 may be disposed to be open to face a protrusion direction of the protruding portion 113 of the bumper 110. Part of the protruding portion 113 of the bumper 110 may be disposed to overlap the first accommodating portion 151 in a top-down direction.

As the cam 141 and the cover plate 142 are rotationally moved from an inside of the first accommodating portion 151 toward the opening portion 101, the first accommodating portion 151 may be disposed to be open in a rotation direction of the cam 141 and the cover plate 142 (a direction covering the cliff sensor 130).

A first shielding wall 155 may extend from one end (an outside) of the partition wall 154 toward one end (a rear end) of the mounting guide 150 along an outer edge portion of the mounting guide 150. The first shielding wall 155 is configured to block an outer boundary of the first accommodating portion 151. The first shielding wall 155 is configured to open an inner boundary of the first accommodating portion 151.

A second shielding wall 156 may extend from the other end (an inside) of the partition wall 154 toward the other end (a front end) of the mounting guide 150 along an inner edge portion of the mounting guide 150. The second shielding wall 156 is configured to block an inner boundary of the second accommodating portion 153. The second shielding wall 156 is configured to open an outer boundary of the second accommodating portion 153.

According to this configuration, the first shielding wall 155 may block the cam 141 and the cover plate 142 from being released from the first accommodating portion 151 to an outside of the first accommodating portion 151.

The second shielding wall 156 may prevent the protruding portion 113 from being excessively inserted into the second accommodating portion 153 to be released from the second accommodating portion 153 to an inside of the cleaner body 100 during the inward movement of the bumper 110.

The mounting guide 150 has a guide hole 152 for limiting a movement range of the guide protrusion 112.

The guide hole 152 may be disposed to pass through the first accommodating portion 151 in a top-down direction. The guide hole 152 may be disposed to overlap the guide protrusion 112 in a top-down direction. The guide protrusion 112 may be inserted into the first accommodating portion 151 by passing through the guide hole 152. The guide protrusion 112 passing through the guide hole 152 is configured to be in contact with the inclined surface 1411 of the cam 141 at an inside of the first accommodating portion 151.

The guide hole 152 may be defined in a trapezoidal shape. The guide hole 152 may be defined to have a circumferential width that becomes wider from an outside of the mounting guide 150 to an inside thereof.

An inner surface of a circumferential surface of the guide hole 152 may be disposed to be inclined with respect to an outer surface of the circumferential surface.

The guide hole 152 may be disposed to have a radial width that becomes wider from a front side to a rear side of the mounting guide 150.

According to this configuration, it may be possible not only to limit an unnecessary movement range of the guide protrusion 112, but also to secure an effective distance of the guide protrusion 112 so as to sufficiently transmit a pushing force to the inclined surface 1411 when the guide protrusion 112 pushes the inclined surface 1411 of the cam 141.

The mounting guide 150 includes a shaft coupling portion 1502 for coupling with the rotation shaft 145.

The shaft coupling portion 1502 may be disposed to protrude in a circular ring shape from an inner surface of the mounting guide 150. A through hole may be disposed in the shaft coupling portion 1502 to pass therethrough in a top-down direction.

The shaft coupling portion 1502 and the hinge portion 143 of the mounting guide 150 may be disposed to overlap in a top-down direction.

The rotation shaft 145 may be disposed in a tubular shape. The rotation shaft 145 may be inserted into and coupled to the hinge hole of the hinge portion 143 and the through hole of the shaft coupling portion 1502. The rotation shaft 145 may be configured to be rotatably supported by the cleaner body 100 with respect to the shaft coupling portion 1502 together with the hinge portion 143.

The shielding module 140 includes an elastic element 146 for restoring the cover plate 142 to an original position.

The elastic element 146 is configured to restore the cover plate 142 from the second position (covers the cliff sensor 130) to the first position (exposes the cliff sensor 130).

The elastic element 146 may be implemented as a spring.

One end of the spring may be fixed to the mounting guide 150. The other end of the spring may be fixed to the cover plate 142.

A first fixing protrusion 157 may be disposed to protrude from the first shielding wall 155 of the mounting guide 150, and one end of the spring may be fixed to the first fixing protrusion 157. However, the present disclosure is not limited thereto, and one end of the spring may be fixed to the cleaner body 100.

A second fixing protrusion 158 may be disposed to protrude from the cover plate 142, and the other end of the spring may be fixed to the second fixing protrusion 158.

Hereinafter, a collision recognition method between the shielding module 140 and the cliff sensor 130 according to the present disclosure when the bumper 110 collides with an obstacle will be described in detail.

Figure 10:
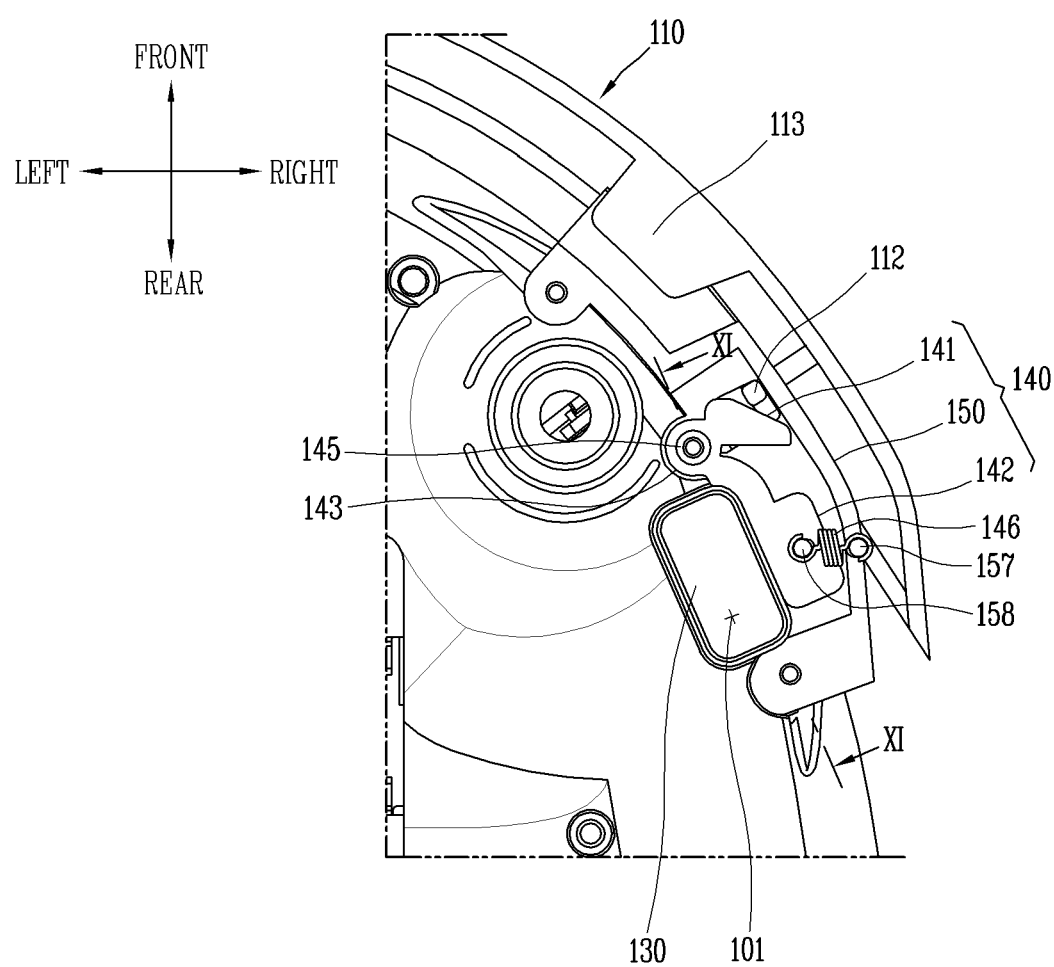
FIG. 10 is a conceptual view showing a shape in which a cover plate is at a first position to expose a cliff sensor before a collision between a bumper and an obstacle.

FIG. 10 is a conceptual view showing a shape in which the cover plate 142 is at a first position to expose the cliff sensor 130 before a collision between the bumper 110 and the obstacle.

Figure 11:
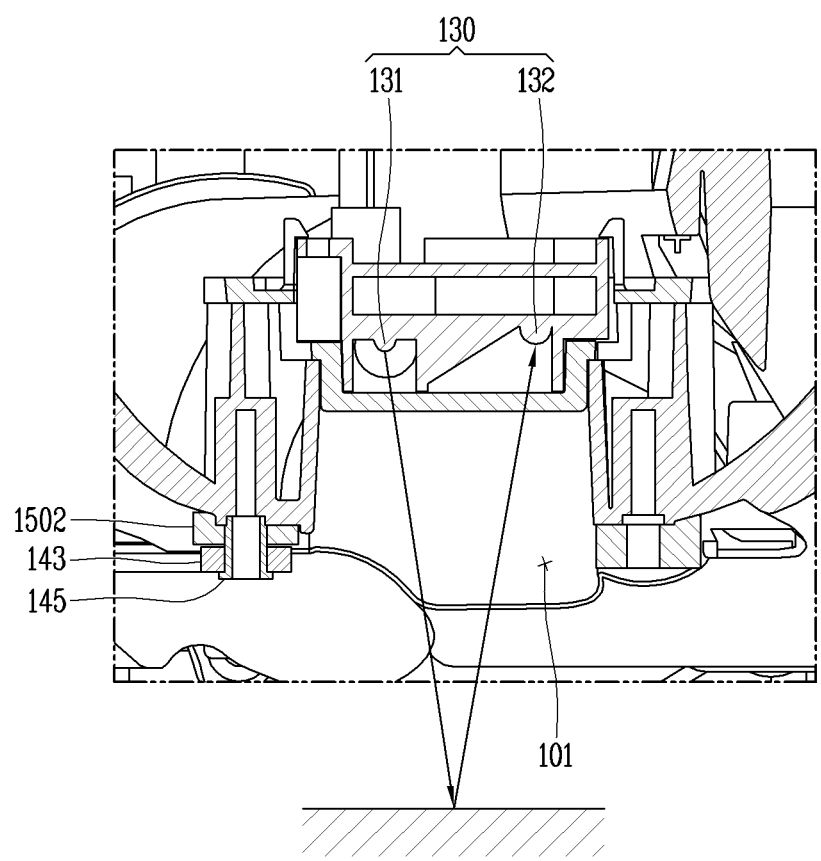
FIG. 11 is a cross-sectional view taken along line XI-XI in FIG. 10.

FIG. 11 is a cross-sectional view taken along line XI-XI in FIG. 10.

Figure 12:
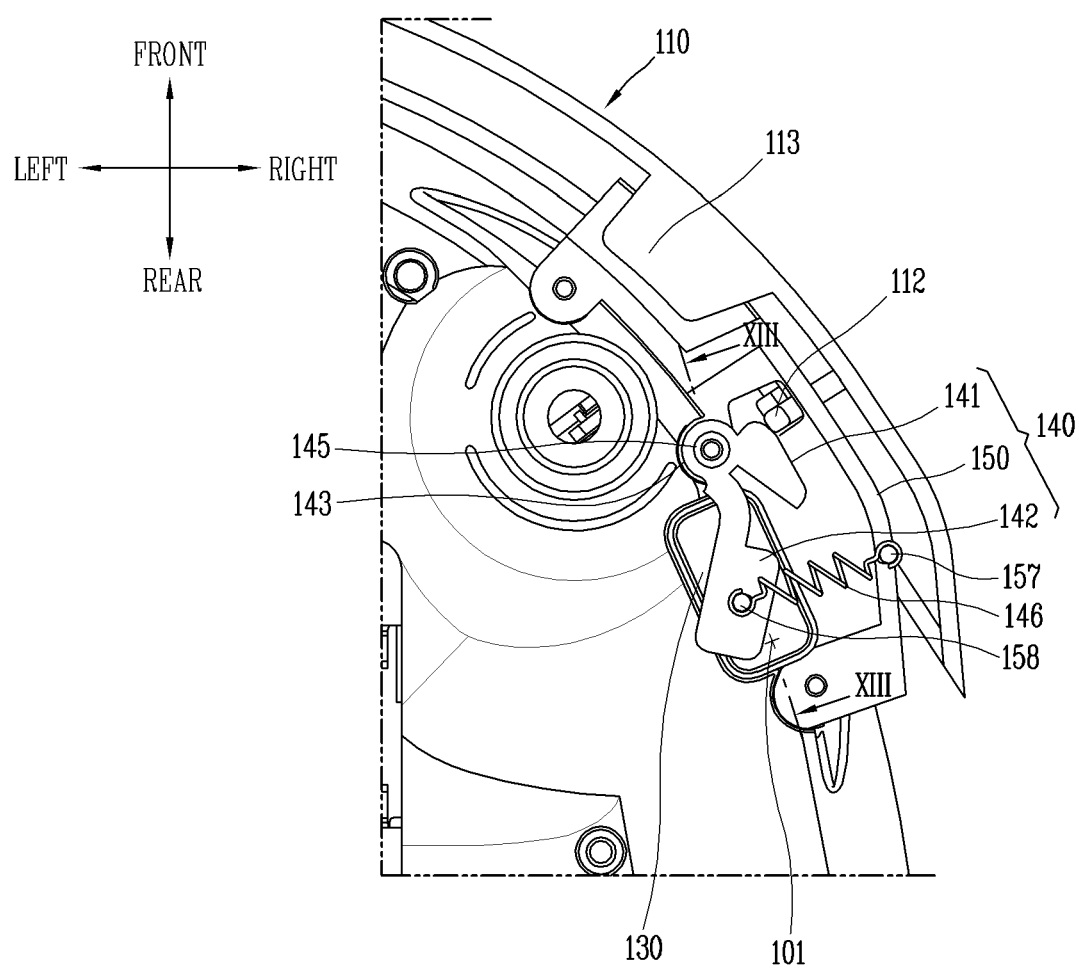
FIG. 12 is a conceptual view showing a shape in which the cover plate is at a second position to cover the cliff sensor after the bumper collides head-on with the obstacle in FIG. 10.

FIG. 12 is a conceptual view showing a shape in which the cover plate 142 is at a second position to cover the cliff sensor 130 after the bumper 110 collides head-on with an obstacle in FIG. 10.

Figure 13:
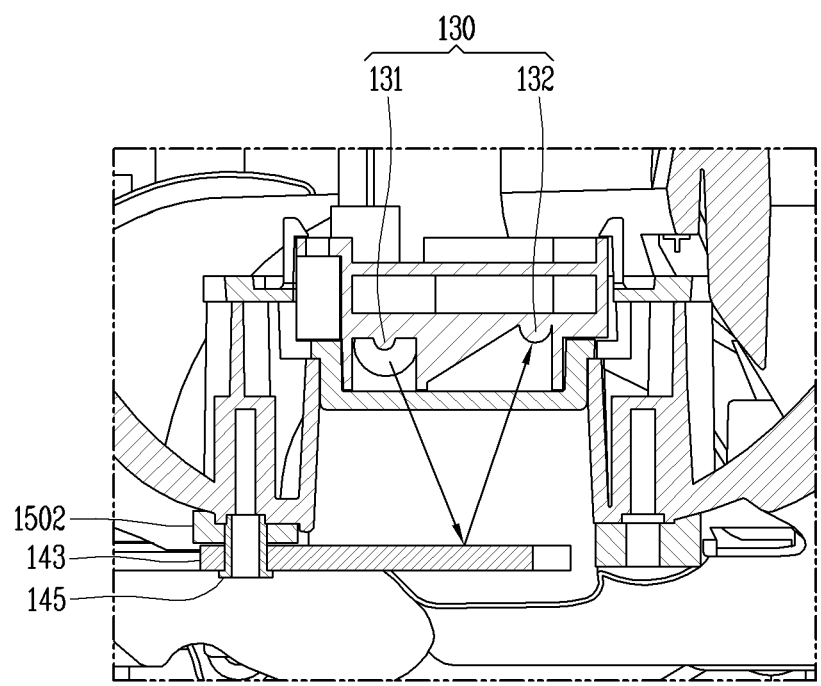
FIG. 13 is a cross-sectional view taken along line XIII-XIII in FIG. 12.

FIG. 13 is a cross-sectional view taken along line XIII-XIII in FIG. 12.

Figure 14:
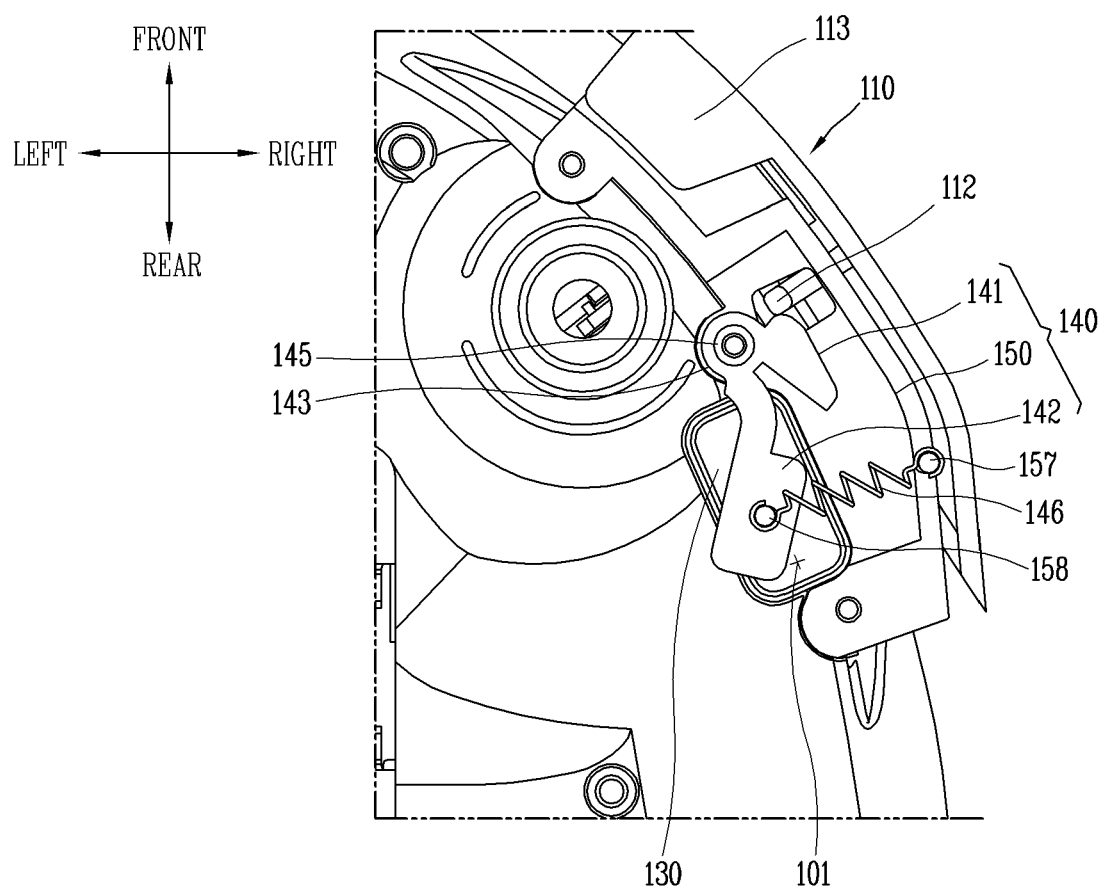
FIG. 14 is a conceptual view showing a shape in which the bumper is at a second position to cover the cliff sensor after the bumper in FIG. 10 collides laterally with the obstacle.

FIG. 14 is a conceptual view showing a shape in which the cover plate 142 is at a second position to cover the cliff sensor 130 after the bumper 110 collides laterally with an obstacle in FIG. 10.

Referring to FIG. 10, before the bumper 110 collides with the obstacle, the cover plate 142 exposes the cliff sensor 130 downward through the first position, that is, the opening portion 101.

In this case, as illustrated in FIG. 11, the light emitting portion 131 of the cliff sensor 130 irradiates light to a terrain below, and the light receiving portion 132 of the cliff sensor 130 receives reflective light reflected from the terrain below.

The controller may receive a detection signal from the cliff sensor 130 and measure a time received by the light receiving portion 132 to detect a terrain below.

Referring to FIG. 12, after the bumper 110 collides head-on with an obstacle, the bumper 110 is pushed backward.

The guide protrusion 112 of the bumper 110 comes into contact with the inclined surface 1411 of the cam 141 while being accommodated in the guide hole 152 of the mounting guide 150 to push the cam 141 backward. The cam 141 rotates clockwise based on the drawing about the rotation shaft 145.

The cover plate 142 rotates from the first position to the second position while maintaining a constant phase angle with the cam 141 about the rotation shaft 145. The first position is a position where the cliff sensor 130 is exposed through the opening portion 101, and the second position is a position where the cliff sensor 130 is covered by the cover plate 142. At the second position, the cover plate 142 and the cliff sensor 130 may be disposed to overlap in a top-down direction.

As the bumper 110 collides head-on with an obstacle, the cover plate 142 may cover at least part of the opening portion 101 to close the cliff sensor 130.

As illustrated in FIG. 13, the light emitting portion 131 of the cliff sensor 130 irradiates light to the cover plate 142, and the light receiving portion 132 of the cliff sensor 130 receives reflective light reflected from the cover plate 142. The cover plate 142 is located higher than a terrain below (the floor on which the vacuum cleaner drives).

The controller may receive a detection signal from the cliff sensor 130 to measure a time received by the light receiving portion 132, compare a preset time value with the measured time value, and recognize that the bumper 110 has collided head-on with the obstacle when it is determined that the measured time value is abruptly smaller than a preset time value.

Here, a distance h between the center of the cover plate 142 and the center of the rotation shaft 145 is two times or more greater than a distance g between a contact point of the inclined surface 1411 of the cam 141 in contact with the guide protrusion 112 and the center of the rotation shaft 145.

A rotational movement distance (an amount of rotation) of the cover plate 142 is much larger than a rotational movement distance (an amount of rotation) of the cam 141 pushed by the guide protrusion 112, so a rotational speed of the cover plate 142 is much faster compared to a rotation speed of the cam 141.

This means that the rotational speed of the cover plate 142 is faster than an inward movement speed of the bumper 110.

Accordingly, as the rotation speed of the cover plate 142 is accelerated, the sensitivity of collision detection using the cliff sensor 130 may be improved.

Referring to FIG. 14, when the bumper 110 collides laterally with an obstacle, the guide protrusion 112 of the bumper 110 moves from right to left based on the drawing while being accommodated in the guide hole 152, but one side surface of the guide hole 152 is disposed to be inclined from right toward left rearward, and the guide protrusion 112 is guided by the guide hole 152 to move from right to left rearward.

A lateral collision between the bumper 110 and the obstacle is different from a head-on collision between the bumper 110 and the obstacle in that a movement direction of the guide protrusion 112 is guided by the guide hole 152 to move from right to left rearward.

The other operations and effects of the cam 141 and the cover plate 142 are the same as or similar to those of the above-described embodiments of FIGS. 12 and 13, and thus a redundant description will be omitted.

Therefore, according to the present disclosure, the shielding module 140 provided at a lower portion of the cleaner body 100 separately from the bumper 110 may selectively expose the cliff sensor 130 in conjunction with an inward movement of the bumper 110, thereby detecting a collision between the bumper 110 and the obstacle.

In addition, the shielding module 140 includes the cam 141 and the cover plate 142 that rotate with the same phase angle around the same rotation shaft 145. A distance between the center of the cover plate 142 and the center of the rotation shaft 145 is configured to be greater compared to a distance between a contact point of the inclined surface 1411 of the cam 141 in contact with the guide protrusion 112 of the bumper 110 and the center of the rotation shaft 145. For this reason, a rotational movement speed of the cover plate 142 rotating to cover the cliff sensor 130 is much faster than an inward movement speed of the bumper 110. Accordingly, a sensitivity between the bumper 110 and the obstacle to collision detection is improved using the cliff sensor 130.

Moreover, the guide protrusion 112 protruding from an inner surface of the bumper 110 is provided on the bumper 110, and the shielding module 140 is provided with the guide hole 152 for limiting a movement range of the guide protrusion 112. The guide hole 152 is disposed to be inclined such that the guide protrusion 112 is able to move the inclined surface 1411 of the cam 141 backward during a head-on collision of the bumper 110 as well as a lateral collision of the bumper 110. For this reason, the cover plate 142 may be guided to cover the cliff sensor 130 in all collision directions of the bumper 110, thereby increasing the reliability of collision detection.

The invention claimed is:

1. A robot cleaner comprising:
  a cleaner body including:
    a front surface portion;
    a bottom portion, the bottom portion including an opening that opens downward;
    a driving wheel; and
    a controller, the controller being configured to control the driving wheel;
  a bumper mounted on the front surface portion, the bumper being movable toward the front surface portion by an external force, the bumper including a guide protruding toward the cleaner body;

a cliff sensor mounted on an inside of the opening to detect a terrain below the opening; and
a shielding module disposed at the bottom portion to detect a collision between the bumper and an obstacle, and
a mounting guide mounted on the bottom portion of the cleaner body, the mounting guide being configured to install the shielding module on the bottom portion, the mounting guide including guide hole, the guide hole being configured to limit a movement range of the bumper,
wherein the shielding module includes:
a rotation shaft mounted to the bottom portion;
a cam contacting the guide, the cam being rotatably mounted to the rotation shaft;
a cover plate rotatably mounted to the rotation shaft while maintaining a phase angle with respect to the cam to selectively expose the cliff sensor; and
wherein the guide is configured to move with respect to the mounting guide while being accommodated in the guide hole according to an inward movement of the bumper.

2. The robot cleaner of claim 1, wherein the cover plate is configured to reciprocally rotate between a first position that exposes the cliff sensor prior to the collision between the bumper and the obstacle and a second position to cover the cliff sensor by an inward movement of the bumper during the collision between the bumper and the obstacle, and
wherein the shielding module further comprises an elastic element configured to move the cover plate from the second position back to the first position.

3. The robot cleaner of claim 2, wherein the elastic element is disposed between the bumper and the opening to elastically push the cover plate such that the cover plate does not overlap the opening in a top-down direction while in the first position.

4. The robot cleaner of claim 1, wherein the cover plate is rotatable from a first position in response to an inward movement of the bumper, and
wherein the shielding module further comprises a spring configured to move the cover plate back to the first position.

5. The robot cleaner of claim 1, wherein the cover plate is rotatable from a first position in response to an inward movement of the bumper,
wherein the mounting guide has a first fixing protrusion, and
wherein the shielding module further comprises:
the cover plate having a second fixing protrusion; and
an elastic element configured to move the cover plate back to the first position, the elastic element having a first side supported by the first fixing protrusion and a second side supported by the second fixing protrusion.

6. The robot cleaner of claim 1, wherein the shielding module further comprises a hinge portion hinge-coupled to the rotation shaft, the hinge portion being connected to the cam and the cover plate to support the cam and the cover plate.

7. The robot cleaner of claim 1, wherein the cam comprises a cam surface contacting the guide, the cam surface extending in a direction intersecting a front-rear direction and a left-right lateral direction with respect to a head-on or lateral collision between the bumper and the obstacle.

8. The robot cleaner of claim 1, wherein a distance between a center of the cover plate and a center of the rotation shaft is greater than a distance between a contact point of the cam in contact with the guide and the center of the rotation shaft.

9. The robot cleaner of claim 1, wherein one side of the guide hole is angled from an outside of the mounting guide to an inside thereof rearward such that the guide is configured to push the cam rearward to rotate.

10. The robot cleaner of claim 9, wherein the cliff sensor is disposed at a rear side of the guide hole.

11. The robot cleaner of claim 9, wherein the cam comprises a cam surface contacting the guide, the cam surface extending in a direction intersecting a front-rear direction and a left-right lateral direction with respect to a head-on or lateral collision between the bumper and the obstacle.

12. The robot cleaner of claim 1, wherein the bumper further comprises a protruding portion disposed to protrude from the bumper toward the mounting guide, and
wherein the mounting guide comprises:
a first accommodating portion configured to accommodate the cover plate such that the cover plate does not overlap the opening in a top-down direction while the cover plate is in a first position; and
a second accommodating portion configured to accommodate the protruding portion to movably support the protruding portion.

13. The robot cleaner of claim 12, wherein the mounting guide is disposed between the bumper and the opening, and
wherein the mounting guide further comprises:
a partition wall separating the first and second accommodation portions;
a first shielding wall extending along an outer edge of the first accommodating portion from a first end of the partition wall such that the first accommodating portion is open in a direction facing the cover plate; and
a second shielding wall extending from a second end of the partition wall along an inner edge of the second accommodation portion such that the second accommodation portion is open in a direction facing the bumper.

14. The robot cleaner of claim 1, wherein the cliff sensor comprises:
a light emitter configured to emit light through the opening; and
a light receiver configured to receive reflected light.

15. The robot cleaner of claim 1, wherein the shielding module is provided as a pair of shielding modules that are disposed symmetrically to each other on a left side and a right side of the cleaner body with respect to a front-rear center line passing through a center of the cleaner body in a front-rear direction.

16. The robot cleaner of claim 1, further comprising a support portion configured to movably support the bumper in a front-rear direction and a left-right lateral direction with respect to the cleaner body.

17. The robot cleaner of claim 16, wherein the bumper further comprises an engaging hook protruding downward from an upper end of the bumper such that the upper end of the bumper is supported on the support portion, and
wherein the support portion comprises:
a support body extending along a front edge of the front surface portion, the engaging hook being slidable along the support body;
an engaging protrusion protruding upward from a front end of the support body, the engaging protrusion configured to cooperate with the engaging hook to limit movement of the bumper away from the front surface portion in the front-rear direction; and
a plurality of fitting portions to couple the support body to the cleaner body.

18. The robot cleaner of claim 1, further comprising a brush module or a mop module mounted to the cleaner body, wherein the opening is located between the front surface portion and the brush module or the mop module.

* * * * *